(12) United States Patent
Beranger et al.

(10) Patent No.: US 6,693,803 B2
(45) Date of Patent: Feb. 17, 2004

(54) COUPLING DEVICE FOR A LOW-RATE CARRIER CURRENT TRANSMISSION SYSTEM

(75) Inventors: Bruno Beranger, Saint Martin d'Uriage (FR); Oleg Garelli, Saint Marcellin (FR); Robert Cittadini, Grenoble (FR)

(73) Assignee: Schneider Electric Industries SAS (FR)

( * ) Notice: Subject to any disclaimer, the term of this patent is extended or adjusted under 35 U.S.C. 154(b) by 0 days.

(21) Appl. No.: 10/254,935

(22) Filed: Sep. 26, 2002

(65) Prior Publication Data

US 2003/0063478 A1 Apr. 3, 2003

(30) Foreign Application Priority Data

Oct. 2, 2001 (FR) .............................................. 01 12633

(51) Int. Cl.$^7$ ............................................ H02M 3/335
(52) U.S. Cl. .................. 363/21.07; 363/21.15
(58) Field of Search ........................ 363/16, 20, 21.01, 363/21.04, 21.07, 21.12, 21.15, 95, 97, 131

(56) References Cited

U.S. PATENT DOCUMENTS

| | | | |
|---|---|---|---|
| 4,370,564 A | | 1/1983 | Matsushita .................. 307/140 |
| 5,301,095 A | * | 4/1994 | Teramoto et al. ........ 363/21.07 |
| 5,671,131 A | * | 9/1997 | Brown ......................... 363/49 |
| 5,675,485 A | * | 10/1997 | Seong ......................... 363/97 |
| 6,396,718 B1 | * | 5/2002 | Ng et al. ................. 363/21.07 |
| 6,507,504 B2 | * | 1/2003 | Nishikawa ............... 363/21.15 |
| 6,525,947 B2 | * | 2/2003 | Umetsu et al. ........... 363/21.15 |

FOREIGN PATENT DOCUMENTS

EP          0 967 737 A       12/1999

* cited by examiner

Primary Examiner—Matthew V. Nguyen
(74) Attorney, Agent, or Firm—Parkhurst & Wendel, L.L.P.

(57) ABSTRACT

The coupling device comprises a transformer having a primary winding in series with a two-way switch controlled via an optocoupler and a three-position selector switch by a control circuit. In standby mode, the switch is connected to an oscillator defining a switching frequency (49 kHz) ensuring power supply of the control circuit, which circuit is able to detect the presence of a carrier on the transformer secondary winding. In receipt mode, the switch is closed and the control circuit analyzes the modulated information received on the transformer secondary winding. In transmission mode, the control circuit causes switching of the switch at the information modulation frequency (132 khz), performing both power supply of the control circuit and transmission of the information.

5 Claims, 6 Drawing Sheets

COUPLING DEVICE FOR A LOW-RATE CARRIER CURRENT TRANSMISSION SYSTEM

BACKGROUND OF THE INVENTION

The invention relates to a coupling device for a low-rate carrier current transmission system, comprising a control circuit, means for supplying power to the control circuit via an AC electrical power distribution system and means for coupling the control circuit to the electrical power system for transmission and receipt of modulated information transmitted by carrier current over the power distribution system, the power supply means comprising a transformer having a primary winding connected to the power distribution system and a secondary winding connected to the control device.

STATE OF THE ART

Low-rate carrier currents, i.e. for a transmission rate lower than 100 kbits/s, for example at 2,400 bits/s, are used in particular in home automation systems for control and/or monitoring of electrical equipment by means of an AC electrical power distribution system (for example 230V and 50 Hz).

Conventional coupling devices generally comprise an isolated power supply designed to supply the electrical power necessary for the coupling device components from the electrical power distribution system. Moreover, an isolated magnetic coupler enables transmission and receipt of modulated information from the electrical equipment to the electrical power system and vice-versa. For safety of persons, both the transformer and the magnetic coupler have to provide a good electrical isolation between the electrical equipment and the electrical power system.

SUMMARY OF THE INVENTION

The object of the invention is to provide a reduced cost coupling device, while achieving a good electrical isolation between the electrical equipment and the electrical power system.

According to the invention, this object is achieved by the fact that the power supply means comprise a two-way switch connected in series with the primary winding, the control circuit comprising means for detecting the presence of a carrier connected to the terminals of the secondary winding, the device comprising an optocoupler controlling the two-way switch and a three-position selector switch controlled by the control circuit, the selector switch having an output connected to a control input of the optocoupler, a first input connected to an output of an oscillator, a second input connected to a transmission output of the control circuit, and a third input connected to an output of preset DC voltage of the power supply means, the output of the selector switch being connected to the first input in standby mode so as to define a preset switching frequency of the power supply means, to the second input in transmission mode so as to modulate the information to be transmitted, and to the third input in receipt mode when the control circuit has detected the presence of a carrier in standby mode.

BRIEF DESCRIPTION OF THE DRAWINGS

Other advantages and features will become more clearly apparent from the following description of a particular embodiment of the invention given as a non-restrictive example only and represented in the accompanying drawings in which.

DESCRIPTION OF A PARTICULAR EMBODIMENT

Figure 1:
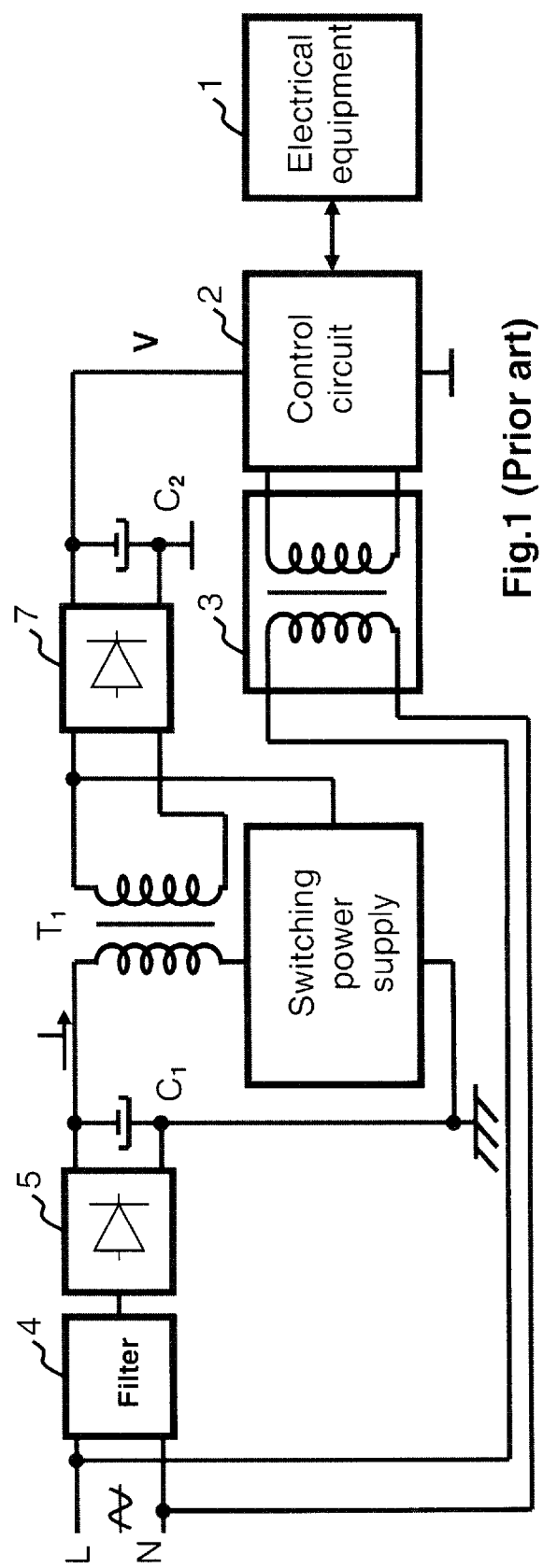
FIG. 1 illustrates a coupling device according to the prior art in block diagram form.

FIG. 1 illustrates a coupling device of conventional type enabling a piece of electrical equipment 1 to be connected to the AC electrical power distribution system (for example 230V, 50 Hz), represented in FIG. 1 by a live conductor L and a neutral conductor N.

The coupling device comprises a control circuit 2 coupled by a two-way connection to the electrical equipment 1. The control circuit 2 is supplied from the electrical power system via an isolated power supply supplying the necessary DC voltage thereto. The control circuit 2 is also connected to the electrical power system by means of an isolated magnetic coupler formed by a coupling transformer 3, preferably with a 1/1 ratio, enabling information to be transmitted, by modulation of the carrier current, from the electrical equipment to the electrical power system, i.e. in transmission, and from the electrical power system to the electrical equipment, i.e. in receipt.

In the known embodiment represented in FIG. 1, the isolated power supply comprises a filter 4 connected up-line to the electrical power system and down-line to a rectifier 5. A storage capacitor $C_1$ is connected on output of the rectifier 5, in parallel with a primary winding of a supply transformer $T_1$ connected in series with a switching power supply circuit 6. A control input of the switching power supply circuit is connected to a secondary winding of the transformer $T_1$ so as to perform regulation of the output voltage of the transformer $T_1$ to a preset value. The output voltage at the terminals of the secondary winding of the transformer $T_1$ is in conventional manner rectified (rectifier 7) and then applied to the terminals of a storage capacitor $C_2$ which thus supplies a DC supply voltage V to the control circuit 2.

For transmission of information from the control circuit 2 to the electrical power system via the coupling transformer 3 to be efficient, on account of the low impedance of the electrical power system (1 to 10 Ohms) at the frequency of the carrier (132 kHz for example), the control circuit 2 has to comprise an amplifier. This increases the consumption of the control circuit 2 in transmission mode, which makes a fairly powerful, and consequently bulky and costly, power supply necessary. Electrical isolation is performed by the supply transformer $T_1$ and the coupling transformer 3. The conventional coupling device, with two transformers to perform electrical isolation and an amplifier, is relatively bulky, complex and costly.

Figure 2:
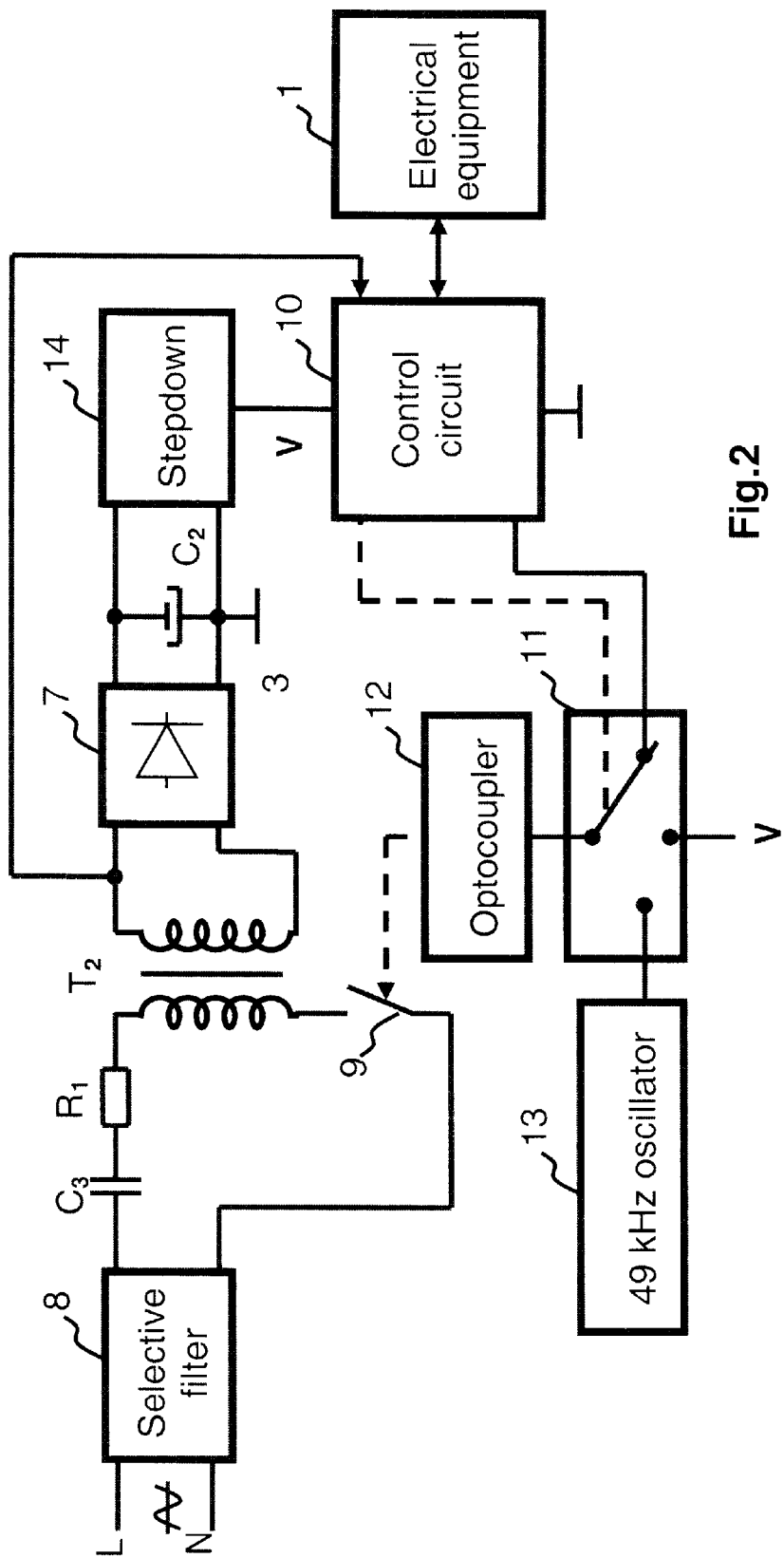
FIG. 2 illustrates a coupling device according to the invention in block diagram form.

The device according to the invention enables the cost of the coupling device to be reduced while improving the electrical isolation if necessary. As represented in FIG. 2, the coupling device according to the invention enables the coupling transformer 3 to be eliminated and a transformer $T_2$ with a 1/1 ratio to be used for both power supply and for information transmission between the control circuit and the electrical power system.

The transformer $T_2$ comprises a primary winding connected to the electrical power system, in series with a limiting resistor $R_1$ and a capacitor $C_3$, via a selective filter 8. As a non-restrictive example the resistor $R_1$ can have a value of about 10 Ohms and the capacitor $C_3$ a value of about one microfarad. The resistor $R_1$ serves the purpose of limiting the current in the event of voltage surges and on start-up when the capacitor $C_3$ is discharged. The capacitor $C_3$ is designed to reduce the current on the primary winding of the transformer $T_2$ when the device is operating in receipt mode as will be described in greater detail hereinafter.

A two-way switch 9, bi-directional in voltage and current, is also connected in series with the primary winding of the transformer $T_2$. It is switched with a different switching frequency depending on whether the coupling device is in standby mode, receipt mode or transmission mode.

A control circuit 10, connected by means of a two-way connection to the electrical equipment 1, controls the two-way switch 9 via a selector switch 11 and an optocoupler 12. The selector switch 11 comprises a first input connected to the output of an oscillator 13, a second input connected to a transmission output of the control circuit 10 and a third input connected to a preset DC voltage output (V in FIG. 2) of the power supply. The output of the selector switch 11 is connected to a control input of the optocoupler 12. The control circuit 10 controls the position of the selector switch 11 and comprises inputs directly connected to the terminals of the transformer $T_2$ secondary winding to enable it to detect the presence of a carrier when the device is in standby mode and to receive the information in receipt mode.

The DC voltage supply V of the control circuit 10 is supplied by the secondary winding of the transformer $T_2$. For this, the voltage at the terminals of the transformer $T_2$ secondary winding is, as in FIG. 1, rectified by a preferably full-wave rectifier 7, and then applied to the terminals of a storage capacitor $C_2$. A filter (not shown) is preferably connected down-line from the rectifier 7. In a preferred embodiment, the voltage at the terminals of the capacitor $C_2$ is relatively high (about 30V) and a stepdown and/or regulating circuit 14 of known type is connected down-line from the terminals of the capacitor $C_2$ to supply the appropriate DC supply voltages (5V and/or 10V). It should be noted that the voltage applied to the third input of the selector switch 11 may be different from the supply voltage V of the control circuit.

The coupling device according to FIG. 2 operates in the manner described below.

Figure 3:
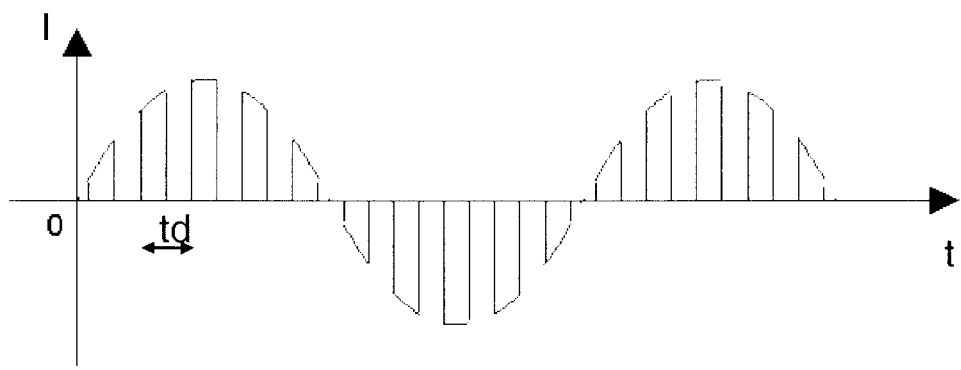
FIGS. 3 to 6 represent, in schematic form, the wave shapes of the current flowing in the primary winding of the transformer of the coupling device according to FIG. 2, respectively in standby mode when no information is transmitted over the electrical power system, in standby mode when information is transmitted by carrier current over the electrical power system, in receipt mode and in transmission mode.

In standby mode, i.e. essentially when no information transmission is taking place, the output of the selector switch 11 is connected to its first input, i.e. to the output of the oscillator 13. The frequency of the oscillator is, in a preferred embodiment, about 49 khz. The power supply then operates as a FORWARD type AC/DC converter, with a switching frequency of 49 khz. The current I flowing in the primary winding of the transformer $T_2$, of general sine wave shape (at 50 Hz), is then switched at the switching frequency (switching period td) as represented schematically in FIG. 3 (in the figures, the switching frequencies represented are not to scale for enhanced clarity of the wave shapes).

Figure 4:
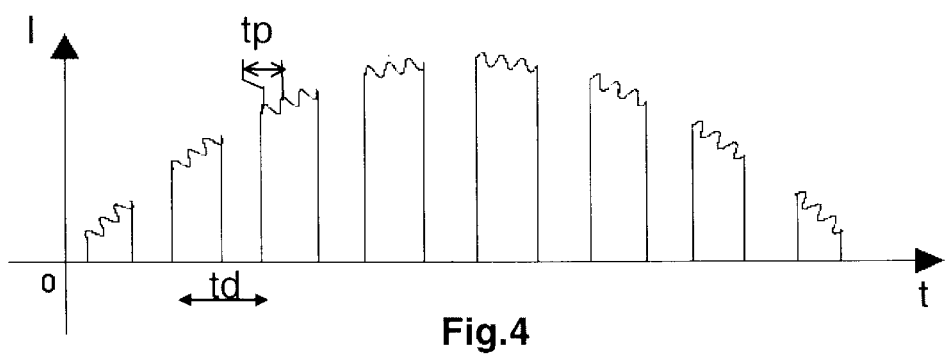
Figure 5:
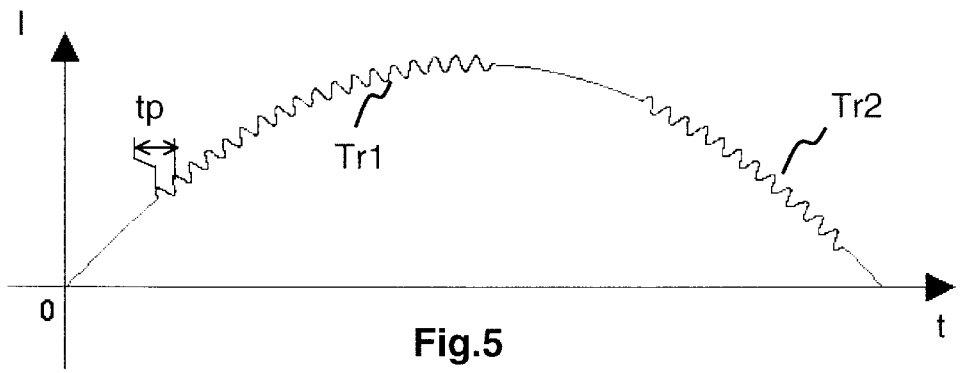
Figure 6:
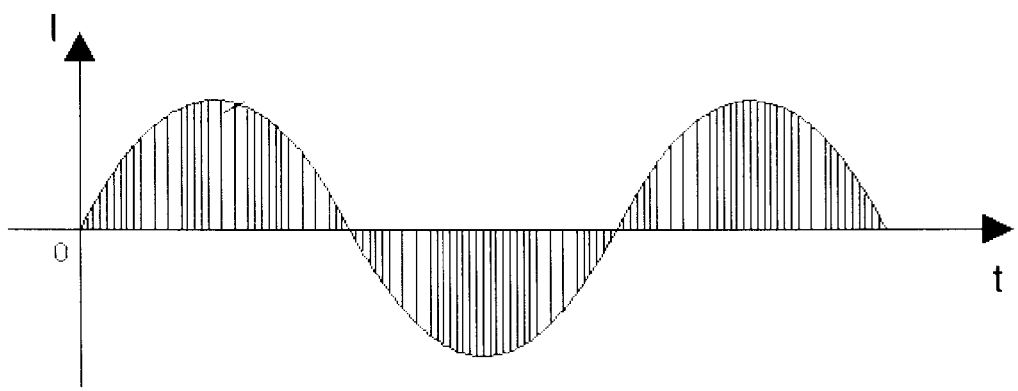

If information is transmitted over the electrical power system by carrier current, the current I is then modulated by this information. In the embodiment represented in FIGS. 4 to 6, this involves a frequency modulation with a carrier frequency of 132 kHz (carrier period tp). The wave form of the current I is then of the type represented in FIG. 4. The presence of the carrier on the electrical power system when the device is in standby mode is detected, by any suitable known means, by the control circuit 10 in the power supply signal switched at 49 kHz present on the transformer secondary winding.

When the presence of the carrier has been detected, the control circuit 10 makes the device switch from standby mode to receipt mode. In receipt mode, the output of the selector switch 11 is connected to its third input, i.e. to a DC voltage, so as to close the two-way switch 9. Thus, in receipt mode, high-frequency switching is no longer performed and the current I on the primary winding of the transformer T2, which is no longer switched, then has the shape represented in FIG. 5—a sine wave at 50 khz modulated during data transmission frames $T_{r1}$ and $T_{r2}$.

The transformer $T_2$ has a ratio close to 1/1 so as not to attenuate the signals in receipt mode. These signals, present on the secondary winding of the transformer $T_2$, can then be decoded and analyzed by the control circuit 10 which can command the electrical equipment 1 accordingly. The capacitor $C_3$, in series with the primary winding of the transformer $T_2$, is designed to limit the primary current when, in receipt mode, the impedance of the transformer $T_2$ supplied at 50 Hz is close to short-circuit.

In receipt mode, the fact that there is no switching on the primary winding of the transformer $T_2$ enables the control circuit 10 to collect the data transmitted over the electrical power system on the transformer $T_2$ secondary with the best possible signal-to-noise ratio. However, this interrupts charging of the power supply storage capacitor $C_2$. To enable correct operation of the control circuit in receipt mode, the storage capacitor $C_2$ is dimensioned in such a way as to enable the energy required by the device throughout receipt mode to be stored in standby mode.

At the end of receipt, the control circuit 10 makes the coupling device switch either to standby mode or to transmission mode if it wants to send an answer over the power system.

In transmission mode, the output of the selector switch 11 is connected by the control circuit 10 with its second input, itself connected to the transmission output of the control circuit 10. The control circuit 10 then sends information modulated around the carrier frequency (132 khz for example) on its transmission output. This carrier modulation is transmitted by the optocoupler 12 to the two-way switch 9. This causes switching of the primary sine wave current I at 50 Hz by the modulated carrier as represented schematically in FIG. 6. This switching of the power supply primary enables the control circuit to be supplied, as in standby mode, by recharging the storage capacitor $C_2$. At the same time, this induces on the primary a high-frequency ripple containing the information to be transmitted over the power system. The transmission power is then provided by the power consumption of the power supply on the electrical power system. The control circuit amplifier which was necessary in prior art coupling devices can then be eliminated. Eliminating this amplifier in turn enables the electrical consumption of the control circuit to be reduced (less than 1W for example) and the power and size of the power supply and therefore enables the cost of the coupling device to be reduced.

Figure 7:
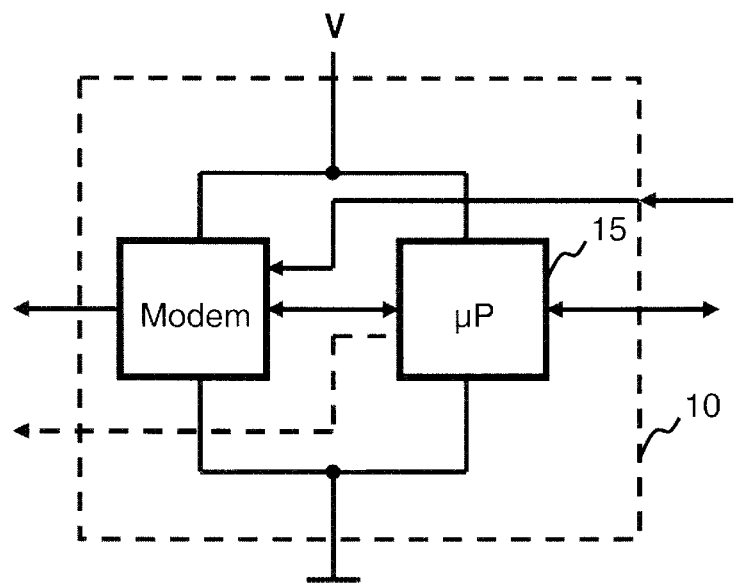
FIG. 7 illustrates a particular embodiment of the control circuit of a coupling device according to FIG. 2 in greater detail.

FIG. 7 illustrates a particular embodiment of the control circuit 10. It comprises a micro-processor 15 connected to the electrical equipment 1 and a modem 16 supplying the information in modulated form. The microprocessor 15 and modem 16 are both supplied by the voltage V or by two voltages supplied by the stepdown circuit 14. The microprocessor 15 controls the selector switch 11. The modem 15 detects the carrier in standby mode and demodulates the information present on the transformer $T_2$ secondary in receipt mode. It communicates this information to the microprocessor 15 which transmits to it the information to be transmitted in transmission mode.

The selective filter 8 must let low frequencies (around 50 Hz) and the switching frequency (49 khz) and transmission band frequencies (around 132 khz) pass. In a preferred embodiment represented in FIG. 8 whose frequency response is illustrated in FIG. 9, the selective filter 8 does not attenuate frequencies lower than or equal to the switching frequency (49 khz) and presents a resonance centered on the carrier frequency (132 khz). It does on the other hand present a very large attenuation of frequencies above 150 khz (upper limit of the useful band authorized in Europe for low-rate carrier current transmissions). The switching frequency in standby mode was chosen so as to avoid polluting the electrical power system with the oscillator 13 and in such a way that its third harmonic (147 khz) is less than 150 khz and is not situated in the useful band of the signal and is attenuated by the selective filter.

Figure 8:
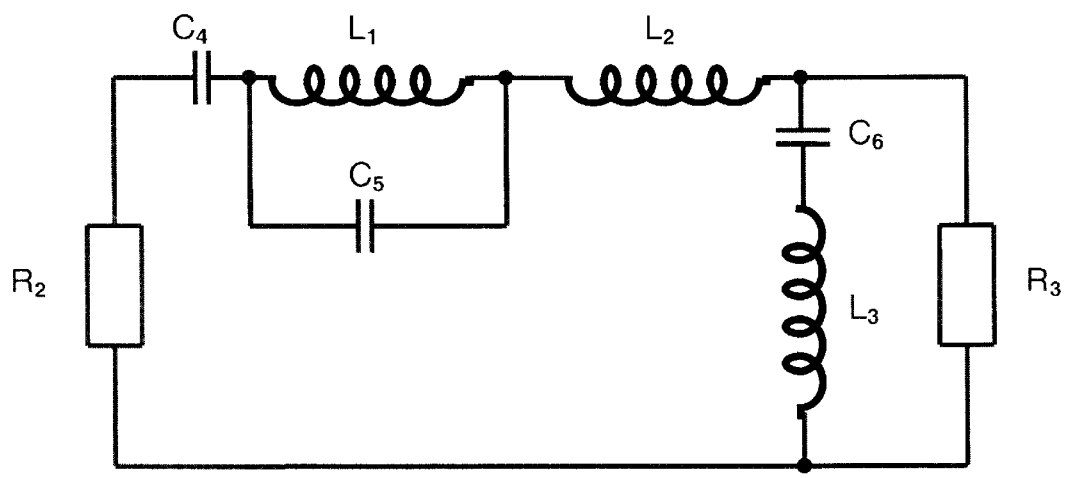
FIG. 8 represents a particular embodiment of the selective filter of a coupling device according to FIG. 2 in greater detail.
Figure 9:
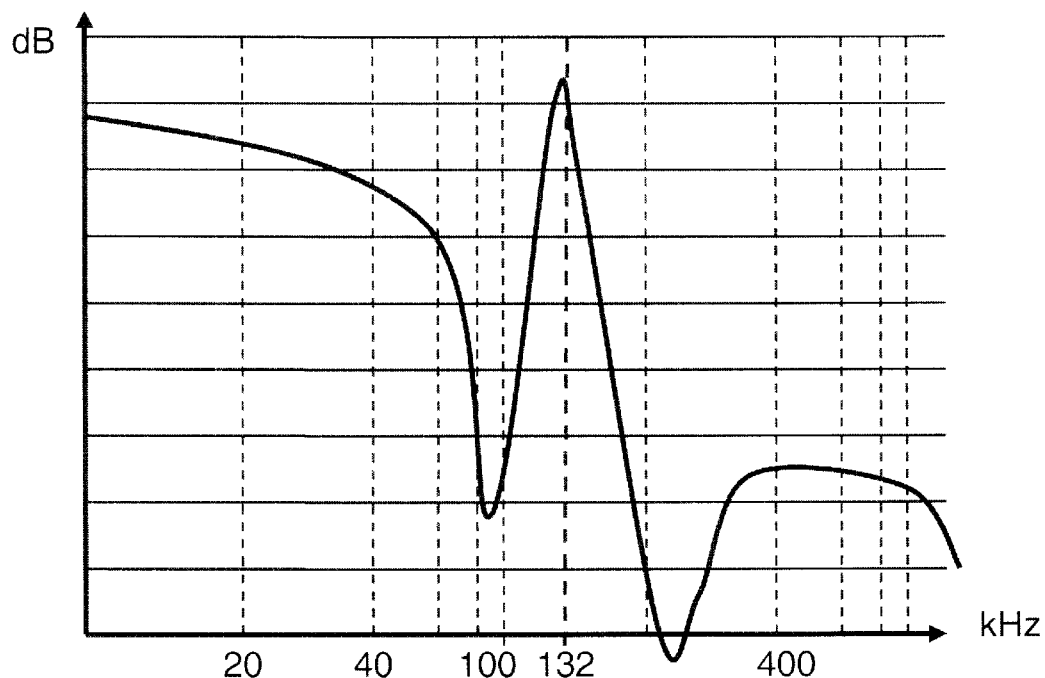
FIG. 9 represents the frequency response curve of the selective filter according to FIG. 8.

The filter of FIG. 8 comprises in series a resistor $R_2$, a capacitor $C_4$, a circuit comprising in parallel an inductance $L_1$ and a capacitor $C_5$, an inductance $L_2$ and a circuit comprising in parallel a resistor $R_3$ and a serial circuit formed by a capacitor $C_6$ and an impedance $L_3$. For example purposes, the response of FIG. 9 corresponds to a filter in which:

$R_2$=25 Ohms $C_4$=1 μF $L_1$=$L_2$=220 μH $C_5$=15 μF $C_6$=47 nF $L_3$=8.2 μH $R_3$=100 Ohms The invention is not limited to the preferred embodiment described above. In particular the information can be modulated in frequency or by any other suitable type of modulation, in particular phase-modulated or with a complex amplitude and phase modulation of QPSK type for example.

Figure 10:
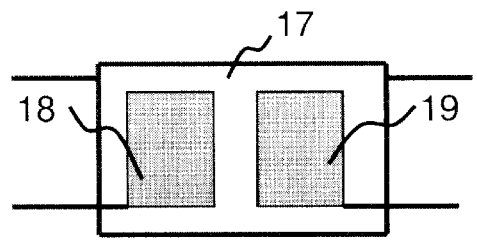
FIG. 10 represents a piezoelectric transformer able to be used in the coupling device according to FIG. 2.

The transformer $T_2$ can be a standard transformer. It can also be replaced by a piezoelectric transformer. Such a transformer, illustrated in FIG. 10, comprises a ceramic support 17 and separate first and second metallized zones 18, 19 respectively constituting the transformer primary and secondary windings.

In all cases, the invention enables the dimensions and cost of a coupling device to be optimized for a low-rate carrier current transmission system while achieving a high electrical isolation with the electrical power system, eliminating one of the transformers hitherto used in known coupling devices, the transformer $T_2$ performing both the power supply function and the coupling function for information transmission and receipt.

The two-way switch 9 can, for example, be constituted by a MOSFET transistor fitted in a fast diode bridge or by two MOSFET or IGBT transistors fitted head-to-tail.

What is claimed is:

1. A coupling device for a low-rate carrier current transmission system, comprising a control circuit, means for supplying power to the control circuit via an AC electrical power distribution system and means for coupling the control circuit to the electrical power system for transmission and receipt of modulated information transmitted by carrier current over the power distribution system, the power supply means comprising a transformer having a primary winding connected to the power distribution system and a secondary winding connected to the control device, wherein the power supply means comprise a two-way switch connected in series with the primary winding, the control circuit comprising means for detecting the presence of a carrier connected to the terminals of the secondary winding, the device comprising an optocoupler controlling the two-way switch and a three-position selector switch controlled by the control circuit, the selector switch having an output connected to a control input of the optocoupler, a first input connected to an output of an oscillator, a second input connected to a transmission output of the control circuit, and a third input connected to an output of a preset DC voltage of the power supply means, the output of the selector switch being connected to the first input in standby mode so as to define a preset switching frequency of the power supply means, to the second input in transmission mode so as to modulate the information to be transmitted, and to the third input in receipt mode when the control circuit has detected the presence of a carrier in standby mode.

2. The device according to claim 1, wherein the power supply means comprise a limiting resistor and a capacitor in series with the primary winding.

3. The device according to claim 1, wherein the switching frequency is about 49 kHz.

4. The device according to claim 1, wherein the information is modulated with a carrier frequency of about 132 kHz.

5. The device according to claim 1, wherein the transformer is a piezoelectric transformer comprising a ceramic support on which separate first and second metallized zones respectively constituting the primary and secondary winding of the transformer are formed.

* * * * *